United States Patent
Baird et al.

(10) Patent No.: US 12,384,564 B2
(45) Date of Patent: Aug. 12, 2025

(54) ON-DEMAND MULTI-LAYER INSULATION, RADIATOR PANELS INCLUDING SAME, AND SPACE VEHICLES INCLUDING SUCH RADIATOR PANELS

(71) Applicant: Northrop Grumman Systems Corporation, Falls Church, VA (US)

(72) Inventors: Lance M. Baird, Los Angeles, CA (US); Deborah Minnichelli, Redondo Beach, CA (US); Dwight L. Ritums, Torrance, CA (US); Jesse B. Tice, Torrance, CA (US); Nadine Y. DeCino, Torrance, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 18/489,428

(22) Filed: Oct. 18, 2023

(65) Prior Publication Data
US 2025/0128833 A1    Apr. 24, 2025

(51) Int. Cl.
*B64G 1/50*    (2006.01)
*B32B 15/08*    (2006.01)

(52) U.S. Cl.
CPC .............. *B64G 1/503* (2013.01); *B32B 15/08* (2013.01); *B32B 2255/205* (2013.01);
(Continued)

(58) Field of Classification Search
CPC .................................... B64G 1/54; B64G 1/50
See application file for complete search history.

(56) References Cited

U.S. PATENT DOCUMENTS

| | | | |
|---|---|---|---|
| 4,248,501 A * | 2/1981 | Simpson ................. | G09F 9/372 359/227 |
| 7,983,042 B2 * | 7/2011 | Wilson ................... | H01L 23/427 361/728 |

(Continued)

OTHER PUBLICATIONS

Goodwin-Johansson et al. "High Speed, Large Motion Electrostatic Artificial Eyelid" Technical Digest. MEMS 2002 IEEE International Conference. Fifteenth IEEE International Conference on Micro Electro Mechanical Systems (Cat. No.02CH37266), Las Vegas, NV, USA, 2002, pp. 610-613.

(Continued)

*Primary Examiner* — Joshua D Huson
*Assistant Examiner* — Shanna Danielle Glover
(74) *Attorney, Agent, or Firm* — TraskBritt (57) ABSTRACT

A Multi-Layer Insulation includes a fixed membrane, a flexible membrane, and at least one electrical insulating layer. The fixed membrane adjoins a substrate. The fixed membrane includes a fixed electrical conducting layer. The flexible membrane includes a thermal insulator and a flexible electrical conducting layer. The flexible membrane is configured to furl into a rolled condition absent application of a voltage across the fixed electrical conducting layer and the flexible electrical conducting layer and is configured to unfurl over the fixed membrane responsive to application of a voltage across the fixed electrical conducting layer and the flexible electrical conducting layer. The at least one electrical insulating layer is located between the fixed electrical conducting layer and the flexible conducting layer. The at least one electrical insulating layer is chosen from a fixed electrical insulating layer of the fixed membrane and an inner electrical insulating layer of the flexible membrane.

20 Claims, 6 Drawing Sheets

(52) U.S. Cl.
 CPC ..... *B32B 2255/26* (2013.01); *B32B 2307/202* (2013.01); *B32B 2307/206* (2013.01); *B32B 2307/304* (2013.01)

(56) References Cited

U.S. PATENT DOCUMENTS

| | | | | |
|---|---|---|---|---|
| 9,944,452 | B1* | 4/2018 | Mills | B65D 81/3813 |
| 10,676,218 | B2* | 6/2020 | Deltour | B64G 1/2225 |
| 2002/0056790 | A1* | 5/2002 | Trimmer | B64G 1/50 |
| | | | | 244/171.7 |
| 2015/0048209 | A1* | 2/2015 | Hoyt | B64G 1/58 |
| | | | | 264/308 |
| 2017/0320600 | A1* | 11/2017 | Cruijssen | B64G 1/222 |
| 2019/0016482 | A1* | 1/2019 | Benthem | B64G 1/58 |

OTHER PUBLICATIONS

Pizzi et al. "New Type of Micro-mechanical Shutter Array for Replacement of Infrared" 2003 IEEE/LEOS International Conference on Optical MEMS (Cat. No.03EX682), Waikoloa, HI, USA, 2003, pp. 173-174.

* cited by examiner

ON-DEMAND MULTI-LAYER INSULATION, RADIATOR PANELS INCLUDING SAME, AND SPACE VEHICLES INCLUDING SUCH RADIATOR PANELS

FIELD

The present disclosure relates generally to thermal insulating panels for a space vehicle, and more specifically to thermal insulating panels with on-demand Multi-Layer Insulation (MLI).

BACKGROUND

Space vehicles are subjected to a large range of thermal environments. Many electronic and power components of space vehicles, such as the command and data handling systems and the electric power system, require tight temperature ranges for proper, reliable operation.

Temperature control systems for the space vehicles are typically complex high SWAP-C systems (systems related to size, weight, power and cost of a space vehicle) that utilize combinations of temperature control components, such as mechanical louvers, resistive heaters, heat pipes, and pumped fluid loops, to manage the temperatures of space vehicles to maintain temperatures within the operating ranges of the electronic and power components. An issue with these temperature control components is that these components are generally expensive, complicated to implement, parasitic power consumers, large in volume and mass and take up space that could be used for other mission critical devices.

With the ever increasing demand for reducing launch mass, overall size of space vehicles, and decreasing parasitic power loss, lighter, less complex and less power hungry technologies are needed for modern space vehicles.

The above-described background relating to thermal management of space vehicles is merely intended to provide a contextual overview of some current issues and is not intended to be exhaustive. Other contextual information may become apparent to those of ordinary skill in the art upon review of the following description, which includes example embodiments.

BRIEF SUMMARY

In one embodiment, the present disclosure provides MLI including a fixed membrane, a flexible membrane, and at least one electrical insulating layer. The fixed membrane adjoins a substrate. The fixed membrane includes a fixed electrical conducting layer. The flexible membrane includes a thermal insulator and a flexible electrical conducting layer. The flexible membrane is adapted to furl into a rolled condition when a voltage is not applied across the fixed electrical conducting layer and the flexible electrical conducting layer and is adapted to unfurl over the fixed membrane when a voltage is applied across the fixed electrical conducting layer and the flexible electrical conducting layer. The at least one electrical insulating layer is between the fixed electrical conducting layer and the flexible conducting layer. The at least one electrical insulating layer is chosen from a fixed electrical insulating layer of the fixed membrane and an inner electrical insulating layer of the flexible membrane.

In another embodiment, the present disclosure provides a radiator panel for a space vehicle. The radiator panel includes a substrate and an MLI. The substrate is of a radiator adapted for emissivity of heat. The MLI includes a fixed membrane, a flexible membrane, and at least one electrical insulating layer. The fixed membrane adjoins the substrate and is adapted for the emissivity. The fixed membrane includes a fixed electrical conducting layer. The flexible membrane includes a thermal insulator adapted to reduce the emissivity and a flexible electrical conducting layer. The flexible membrane is adapted to furl based on a stress gradient between layers thereof and is adapted to unfurl over the fixed membrane when a voltage is applied across the fixed electrical conducting layer and the flexible electrical conducting layer. The at least one electrical insulating layer is between the fixed electrical conducting layer and the flexible electrical conducting layer. The at least one electrical insulating layer is chosen from a fixed electrical insulating layer of the fixed membrane positioned on a side of the fixed electrical conducting layer opposite the substrate and an inner electrical insulating layer of the flexible membrane positioned on an inner side of the flexible membrane adjacent to the fixed membrane.

In a further embodiment, the present disclosure provides a space vehicle. The space vehicle includes a radiator panel and a controller. The radiator panel includes a substrate of a radiator adapted for emissivity of heat and an MLI. The MLI includes a fixed membrane, a flexible membrane, and at least one electrical insulating layer. The fixed membrane adjoins the substrate and is adapted for the emissivity. The fixed membrane includes a fixed electrical conducting layer. The flexible membrane includes a thermal insulator adapted to reduce the emissivity and a flexible conducting layer. The flexible membrane is adapted to furl based on a stress gradient between layers thereof and is adapted to unfurl over the fixed membrane when a voltage is applied across the fixed electrical conducting layer and the flexible electrical conducting layer. The at least one electrical insulating layer is between the fixed electrical conducting layer and the flexible electrical conducting layer. The at least one electrical insulating layer is chosen from a fixed electrical insulating layer of the fixed membrane positioned on a side of the fixed electrical conducting layer opposite the substrate and an inner electrical insulating layer of the flexible membrane positioned on an inner side of the flexible membrane adjacent to the fixed membrane. The controller is operatively coupled to the MLI and is configured to cause the voltage to be applied across the fixed electrical conducting layer and the flexible electrical conducting layer to control deployment of the flexible membrane over the fixed membrane.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

In various embodiments, the present disclosure relates to thermal management of a space vehicle using MLI that includes a fixed membrane adjoining a substrate and a flexible membrane including a thermal insulator integrated into at least one layer thereof. The MLI is configured to change between an open state, with the flexible membrane in an undeployed condition, and a closed state, with the flexible membrane in a deployed condition where the thermal insulator is deployed over the fixed membrane and the substrate, which reduces thermal emissivity of the space vehicle. In particular, the flexible membrane is configured to furl into the open state/undeployed condition in response to a stress gradient resulting from different thermal coefficients of expansion between multiple layers thereof and is configured to unfurl over the fixed membrane into the closed state/deployed condition responsive to a voltage being applied across a fixed electrical conducting layer of the fixed membrane and a flexible electrical conducting layer of the flexible membrane. The stress gradient is caused by different thermal coefficients of thermal expansion between the multiple layers. The multiple layers expand at different lengths, which causes the flexible membrane to furl into the open state/undeployed condition.

The voltage applied across the fixed electrical conducting layer and the flexible electrical conducting layer causes an electrostatic force between the fixed electrical conducting layer and the flexible electrical conducting layer that is greater than the stress gradient between the layers of the flexible membrane, which pulls the flexible electrical conducting layer towards the fixed electrical conducting layer and causes the flexible membrane to unfurl over the fixed membrane into the closed state/deployed condition. With the thermal insulator of the flexible membrane integrated into at least one layer thereof, the MLI acts as an electrostatic thermal shutter, which may be utilized for thermal management of a space vehicle. The MLI is a low cost and low complexity solid state device, compared to other SWAP-C components/systems, which may reduce SWAP-C associated with thermal management systems as compared to current thermal management systems. Additionally, the MLI may be modular, which may facilitate the integration of the MLI into the space vehicle.

Figure 1:
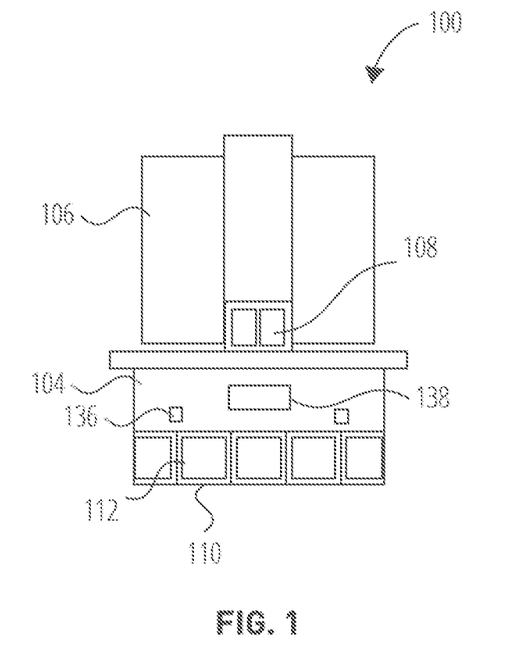
FIG. 1 is a schematic illustration of a space vehicle in accordance with embodiments of the present disclosure.

FIG. 1 is a schematic illustration of a space vehicle 100 in accordance with embodiments of the present disclosure. In embodiments, the space vehicle 100 includes a body 104, at least one radiator panel 110 positioned in or on the body 104, and a controller 138 operatively coupled to the at least one radiator panel 110. As will be described in greater detail below, the radiator panel 110 includes at least one MLI 112 that is configured for thermal management of the space vehicle 100. The MLI 112 is configured to act as a thermal shutter to control emissivity, such as emissivity of heat and light, therethrough. The controller 138 is configured (i.e., programmed) to operate the MLI 112 by initiating and controlling a voltage being applied across the MLI 112.

In some embodiments, the space vehicle 100 also includes at least one sensor 136. The at least one sensor 136 is operatively coupled to the controller 138. The at least one sensor 136 is configured to detect at least one condition chosen from radiation, light, and other conditions related to control of the MLI 112, such as various temperatures detected at and within the space vehicle, and output a signal value representative of a magnitude of the at least one condition. The controller 138 is configured to control the MLI 112 responsive to a signal value of the at least one condition detected by the at least one sensor 136. In some embodiments, the at least one sensor 136 includes photodiode detectors for detecting sunlight. In some embodiments, the at least one sensor 136 includes thermocouples and the controller 138 is configured to utilize a temperature feedback loop in the control of the MLI 112 along with other inputs, such as the detected sunlight from photodiode detectors.

In embodiments, space vehicle 100 includes Electronic Components 108, such as command and data handling systems, an electric power system, communication equipment, and the like. In some of these embodiments, the controller 138 is integrated into one of the Electronic Components 108, such as the command system. In other embodiments, the controller 138 is a separate system from the Electronic Components 108 and operatively coupled to one or more of the Electronic Components 108.

The space vehicle 100 may also include an array of solar panels 106 configured to supply power to the Electronic Components 108 and to the controller 138.

Figure 2:
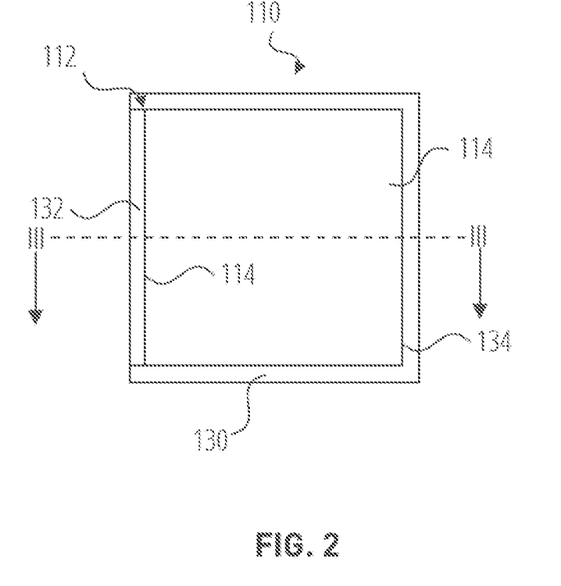
FIG. 2 is a front view of an embodiment of a radiator panel for the space vehicle of FIG. 1 in accordance with the present disclosure.
Figure 3:
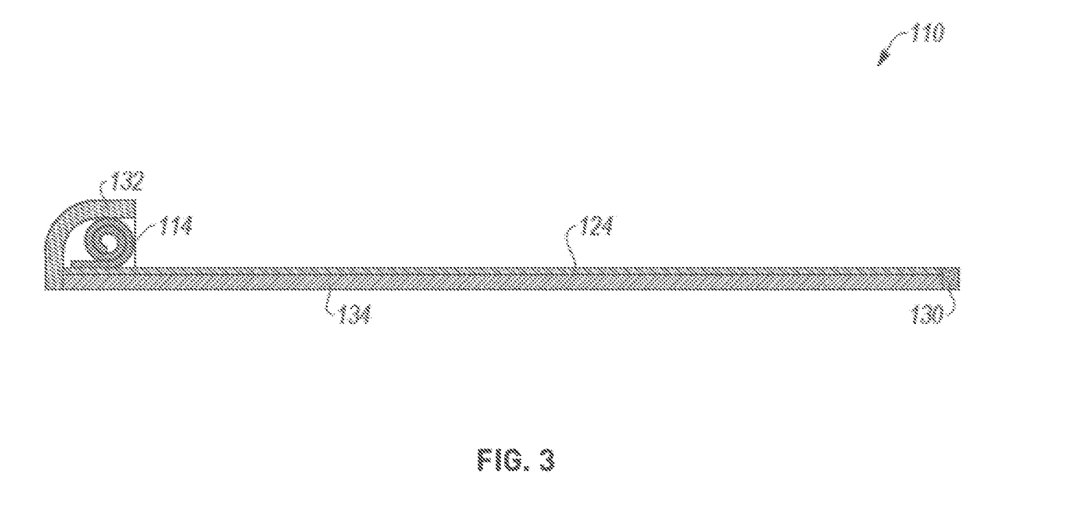
FIG. 3 is a cross-sectional view of the radiator panel of FIG. 2 taken along line III-III.

FIG. 2 is a front view of an embodiment of the radiator panel 110 for the space vehicle 100 of FIG. 1 in accordance with the present disclosure. FIG. 3 is a cross-sectional view of the radiator panel 110 of FIG. 2 taken along line III-III. Referring to FIGS. 2 and 3, the radiator panel 110 includes a substrate 134 and the MLI 112. The substrate 134 is configured for emissivity, such as to facilitate emissivity of heat and emissivity of light into and out of the space vehicle 100, which allows heat and light to pass through the substrate 134. In embodiments, the substrate 134 is a radiator, forms at least a portion of a radiator, or is an element of a radiator. The radiator is configured for thermal management of the space vehicle 100, such as to absorb and expel heat to manage the temperatures of the various components and electronics of the space vehicle 100. In some embodiments, the substrate 134 is transparent. With a transparent material, the substrate 134 can allow sunlight to pass therethrough. The substrate may be constructed of a thermoplastic polymer. In some embodiments, the substrate is a colorless thermoplastic polymer, such as Polyether Ether Ketone (PEEK). In some embodiments, the substrate includes a thickness from 10 to 15 micrometers, and in some embodiments, the thickness is about 12.5 micrometers.

The MLI 112 includes a fixed membrane 124 and a flexible membrane 114. The fixed membrane 124 adjoins the substrate 134. The fixed membrane 124 is configured for emissivity, such as to facilitate emissivity of heat and emissivity of light, which allows heat and light to pass through the fixed membrane 124 into and out of the space vehicle 100. In embodiments, the fixed membrane 124 is fixed to the substrate 134.

The flexible membrane 114 is configured to furl based on a stress gradient between layers thereof and is configured to unfurl over the fixed membrane 124 to provide thermal insulation and reduce the emissivity of the MLI 112 responsive to an applied voltage.

In embodiments, the radiator panel 110 also includes a compartment 132 positioned adjacent to and longitudinally coextensive with an edge of the fixed membrane 124, such as next to or adjoining the edge of the fixed membrane 124. In embodiments, the compartment 132 is open in an opposing direction from the edge of the fixed membrane 124. The compartment 132 is sized and configured to receive the flexible membrane 114 in an undeployed and furled condition adjacent to the edge. In embodiments, the compartment 132 is sized to present a low-profile relative to the fixed membrane 124. With a low-profile, the compartment 132 does not protrude outward too much from the space vehicle 100. In some embodiments, the low profile is about one inch or less (about 2.54 centimeters or less).

In some embodiments, radiator panel 110 includes a border 130 around the MLI 112 defining a frame around the fixed membrane 124 within which the flexible membrane 114 unrolls. In some of these embodiments, the border 130 includes thermal insulation. The border 130 may be constructed of polycarbonate, polyether ether ketone (PEEK), a fiberglass an astroquartz composite, and the like.

In some embodiments, the MLI 112 is about one meter by one meter in size. In other embodiments, the MLI 112 is about one meter by one meter or less.

Figure 4:
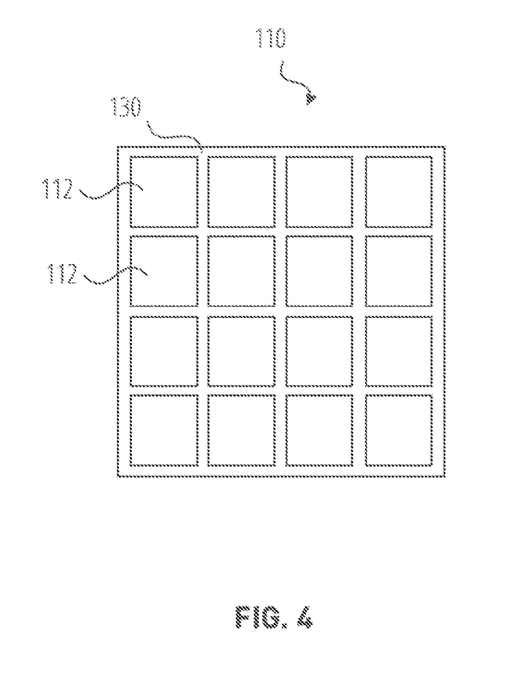
FIG. 4 is a front view of another embodiment of the radiator panel for the space vehicle of FIG. 1 in accordance with the present disclosure.

FIG. 4 is a front view of another embodiment of the radiator panel 110 for the space vehicle 100 of FIG. 1 in accordance with the present disclosure. Referring to FIG. 4, in embodiments, the radiator panel 110 includes multiple MLIs 112. The multiple MLIs 112 may be an array of MLIs 112 evenly spaced in the radiator panel 110 with borders 130 separating the multiple MLIs 112 and defining frames around the respective fixed membranes 124 within which the respective flexible membranes 114 unroll. However, the radiator panel 110 can include any arrangement of MLIs 112. In some embodiments, the multiple MLIs 112 each adjoin the same substrate 134 and in other embodiments, each of the multiple MLIs 112 adjoins a separate substrate 134. In embodiments, the radiator panel 110 is configured for individual control of each of the multiple MLIs 112 with each of the multiple MLIs 112 being configured to independently deploy the respective flexible membrane 114 over the respective fixed membrane 124. In some embodiments, each of the multiple MLIs 112 is formed as a tile that is then arranged within the frames defined by the borders 130.

Figure 5:
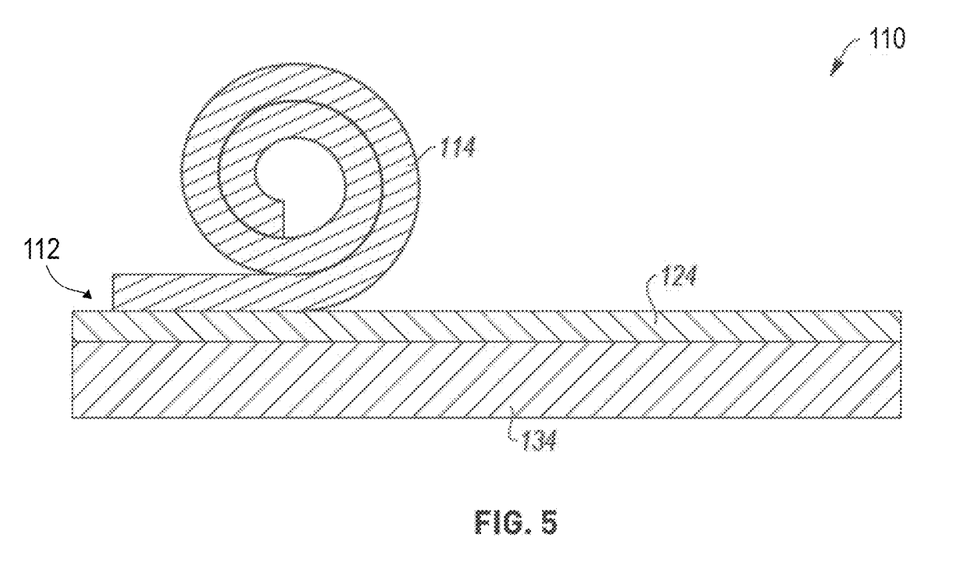
FIG. 5 is a cross-sectional view of an embodiment of the radiator panel of FIGS. 1-4 with the MLI in an undeployed state in accordance with the present disclosure.
Figure 6:
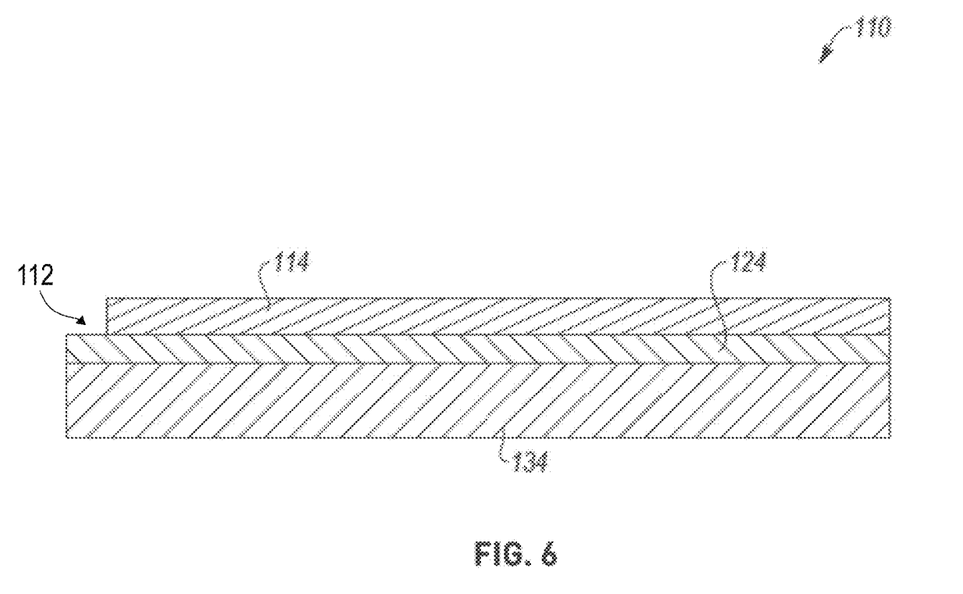
FIG. 6 is a cross-sectional view of the radiator panel of FIG. 5 with the MLI in a deployed state.
Figure 7:
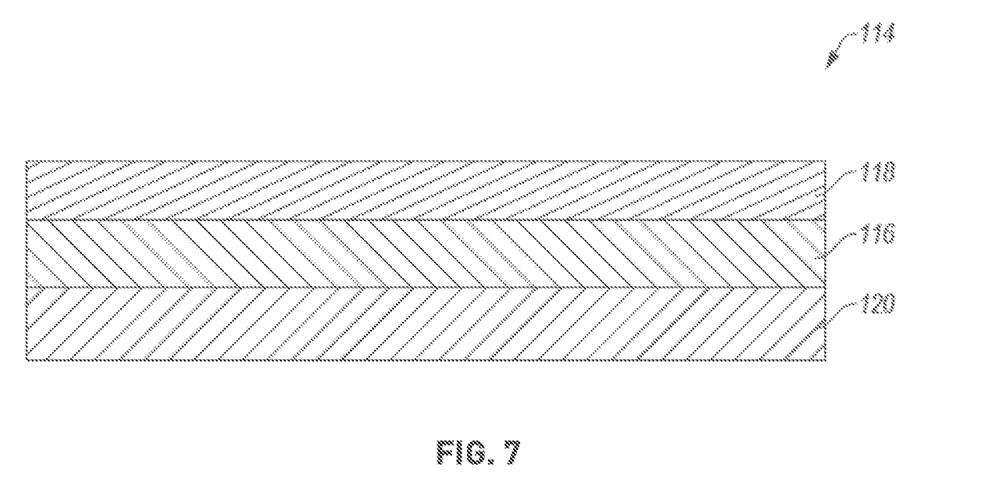
FIG. 7 is a detailed cross-sectional view of an embodiment of a flexible membrane of FIGS. 5 and 6 in accordance with the present disclosure.
Figure 8:
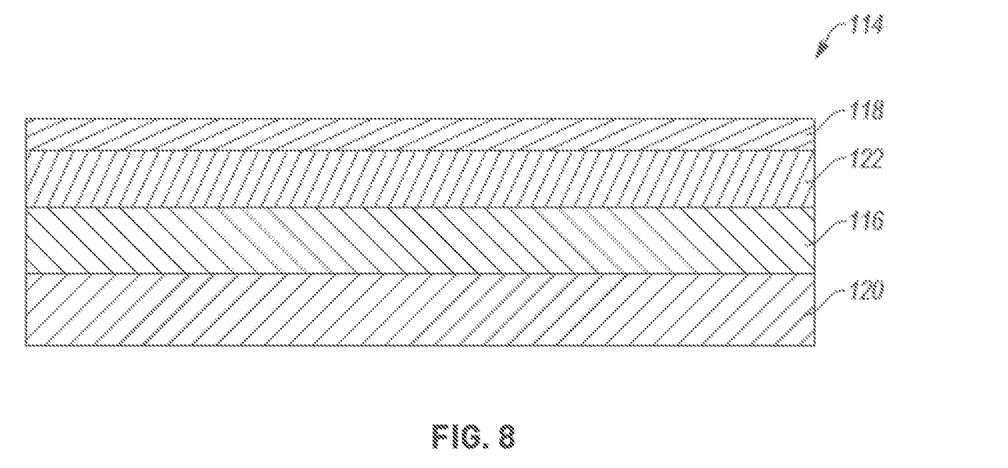
FIG. 8 is a detailed cross-sectional view of another embodiment of the flexible membrane of FIGS. 5 and 6 in accordance with the present disclosure.
Figure 9:
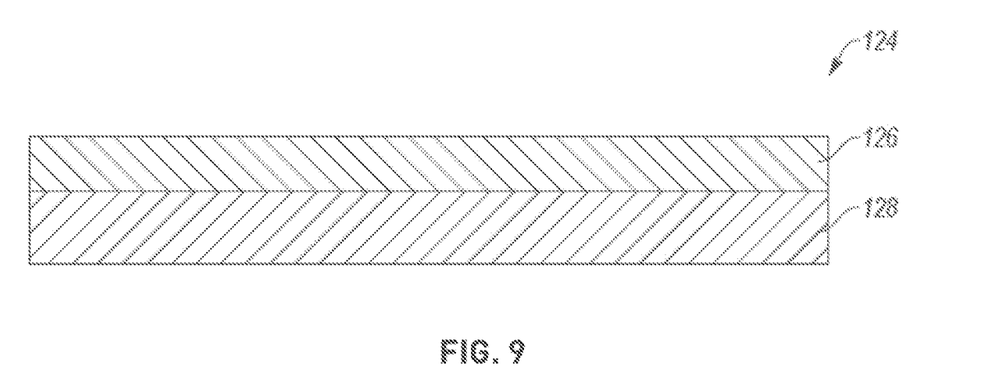
FIG. 9 is a detailed cross-sectional view of an embodiment of a fixed membrane of FIGS. 5 and 6 in accordance with the present disclosure.

FIG. 5 is a cross-sectional view of an embodiment of the radiator panel 110 of FIGS. 1-4 with the MLI 112 in an undeployed state in accordance with the present disclosure. FIG. 6 is a cross-sectional view of the radiator panel 110 of FIG. 5 with the MLI in a deployed state. FIG. 7 is a detailed cross-sectional view of an embodiment of the flexible membrane 114 of FIGS. 5 and 6 in accordance with the present disclosure. FIG. 8 is a detailed cross-sectional view of another embodiment of the flexible membrane 114 of FIGS. 5 and 6 in accordance with the present disclosure. FIG. 9 is a detailed cross-sectional view of an embodiment of the fixed membrane 124 of FIGS. 5 and 6 in accordance with the present disclosure. Referring to FIGS. 5-9, the MLI 112 includes the fixed membrane 124, the flexible membrane 114, and at least one electrical insulating layer 120, 126.

The fixed membrane 124 includes a fixed electrical conducting layer 128. The fixed electrical conducting layer 128 is an electrode. In embodiments, the fixed electrical conducting layer 128 adjoins the substrate 134. In some of these embodiments, the fixed electrical conducting layer 128 is fixed to and supported by the substrate 134 to maintain a position and rigidity thereof. The fixed electrical conducting layer 128 is configured to facilitate emissivity, such as for emissivity of heat and emissivity of light, which allows heat and sunlight to pass into and out of the space vehicle 100. In embodiments, the fixed electrical conducting layer 128 is transparent, which allows sunlight to pass therethrough while the MLI 112 is in an open state. The fixed electrical conducting layer 128 may be constructed of a conductive metal. In some embodiments, the fixed electrical conducting layer 128 is a conductive metal tape, such as conductive copper tape. In some embodiments, the fixed electrical conducting layer 128 includes a thickness from 90 to 110 nanometers. In some embodiments, the fixed electrical conducting layer 128 is about 100 nanometers.

The flexible membrane 114 includes a thermal insulator 118 and a flexible electrical conducting layer 116. The flexible membrane 114 is configured to furl into a rolled/undeployed condition absent application of a voltage across the fixed electrical conducting layer 128 and the flexible electrical conducting layer 116 and to unfurl over the fixed membrane 124 into an unrolled/deployed condition responsive to application of a voltage across the fixed electrical conducting layer 128 and the flexible electrical conducting layer 116. In particular, the applied voltage creates an electrostatic force between the fixed electrical conducting layer 128 and the flexible electrical conducting layer 116 that is greater than the stress gradient between the layers of the flexible membrane 114, which causes the flexible membrane 114 to unfurl over the fixed membrane 124, which deploys and positions the thermal insulator 118 (i.e., at least one layer of thermal insulation) over the fixed membrane 124 and the substrate 134, reducing emissivity therethrough. The thermal insulator 118 is configured to provide insulation over the fixed membrane 124 and the substrate 134 while in the unrolled/deployed state.

The flexible electrical conducting layer 116 may be constructed of a conductive material, such as a metal oxide or an optoelectronic material. In some embodiments, the flexible electrical conducting layer 116 is constructed of a material chosen from one of Indium Tin Oxide (ITO) and Aluminum Zinc Oxide (AZO). In some embodiments, the flexible electrical conducting layer 116 includes a thickness from 90 to 110 nanometers. In some embodiments, the flexible electrical conducting layer 116 is about 100 nanometers.

In embodiments, one edge of the flexible membrane 114 is fixed relative to the fixed membrane 124. In some of these embodiments, the one edge of the flexible membrane 114 adjoins and is connected to the fixed membrane 124.

In embodiments, the thermal insulator 118 forms an outer layer of the flexible membrane 114. In some of these embodiments, the flexible membrane 114 includes an outer electrical insulating layer 122 fixed to the flexible electrical conducting layer 116 between the flexible electrical conducting layer 116 and the thermal insulator 118.

In embodiments, the thermal insulator 118 includes a thermal coating, such as a thermally insulating film. The thermally insulating film may be polyimide, polyetherimide, polycarbonate, mylar, and the like. In some embodiments, the polyimide film includes a vapor deposited aluminum coating. In embodiments, the polyimide film forms an exterior of the flexible membrane 114 and the vapor deposited aluminum coating is applied to an outer surface of the polyimide film. In some embodiments, the thermal insulator 118 includes a thickness from 10 to 15 micrometers, and in some embodiments, the thickness is about 12.5 micrometers. In some embodiments, the thermal insulator 118 is integrated into or at one of the layers of the flexible membrane 114 using a thermal lamination process incorporating a low outgassing adhesive.

In embodiments, the at least one electrical insulating layer is chosen from a fixed electrical insulating layer 126 of the fixed membrane 124 and an inner electrical insulating layer 120 of the flexible membrane 114. Thus, in embodiments, the fixed membrane 124 includes a fixed electrical insulating layer 126 positioned on a side of the fixed electrical conducting layer 128 opposite the substrate 134 and/or the flexible membrane 114 includes an inner electrical insulating layer 120 positioned on an inner side of the flexible membrane 114 adjacent to the fixed membrane 124. The fixed electrical insulating layer 126 may be constructed of a thermoplastic polymer. In some embodiments, the fixed electrical insulating layer 126 is a colorless thermoplastic polymer, such as Polyether Ether Ketone (PEEK) or a polycarbonate. The fixed electrical insulating layer 126 may be constructed of a polyimide film or a polyester, such as polyethylene Napthlate (PEN). In some embodiments, each of the at least one electrical insulating layers includes a thickness from 10 to 15 micrometers, and in some embodiments, the thickness is about 12.5 micrometers.

Referring to FIGS. 7 and 8, in some embodiments, the thermal insulator 118 is formed as an external layer of the flexible membrane 114 and is a separate layer from the outer electrical insulating layer 122. In other embodiments, the thermal insulator 118 and the outer electrical insulating layer 122 are integrated into a single layer. However, in embodiments, the thermal insulator 118 is integrated into one or more of any of the layers of the flexible membrane 114.

Figure 10:
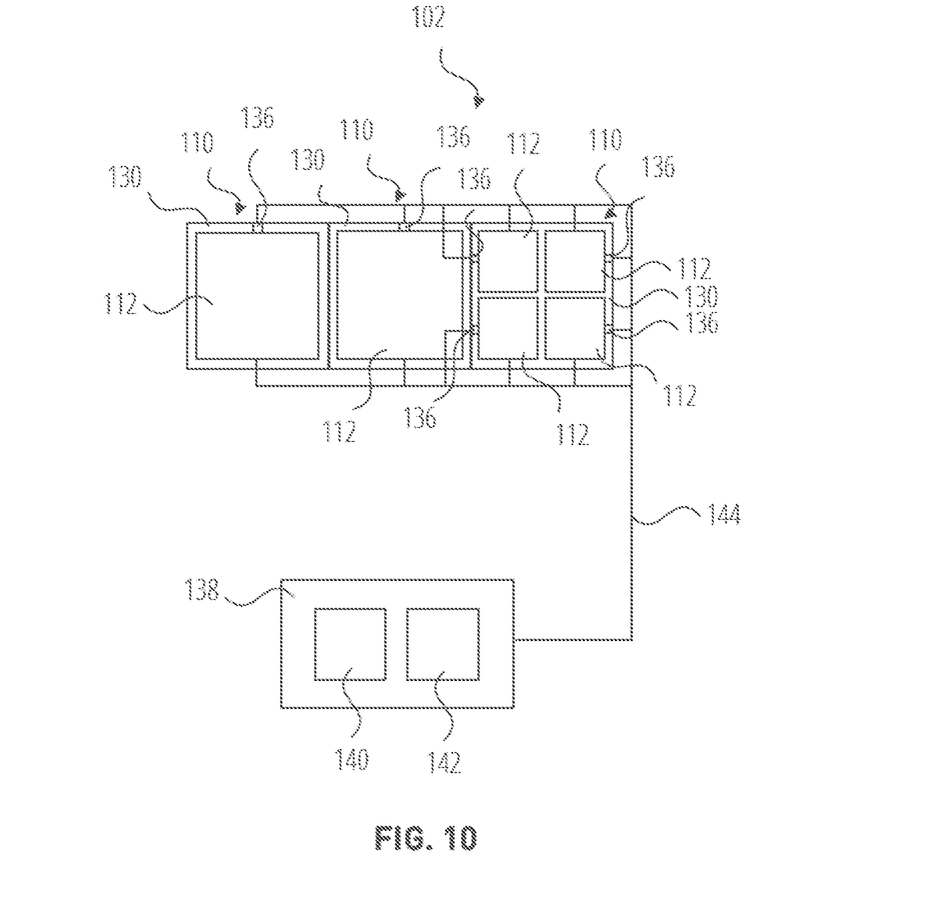
FIG. 10 is a schematic illustration of an MLI system in accordance with embodiments of the present disclosure.

FIG. 10 is a schematic illustration of an MLI system 102 in accordance with embodiments of the present disclosure. In embodiments, the MLI system 102 includes a radiator panel 110 and the controller 138. In the embodiment illustrated, the MLI system 102 includes an array of the radiator panels 110. The array of the radiator panels 110 includes any combination of the embodiments of the radiator panel 110 disclosed herein.

In embodiments, the MLI system 102 includes at least one sensor 136. In some embodiments, the MLI system 102 includes at least one sensor 136 for each radiator panel 110. In some embodiments, the MLI system 102 includes at least one sensor 136 for each MLI 112. In the embodiment illustrated, the sensors 136 are positioned on the radiator panel 110, such as within a border 130 of the radiator panel 110 adjacent to a respective MLI 112. In other embodiments, the sensors 136 are positioned adjacent to the radiator panel 110, such as on an outer surface of the space vehicle 100, as illustrated in FIG. 1.

The controller 138 is operatively coupled to each radiator panel 110, and in particular, is operatively coupled to the MLI 112. The coupling 144 between the controller 138 and the MLI 112 is configured to initiate and control voltage to be applied across the fixed electrical conducting layer 128 and the flexible electrical conducting layer 116 of a respective MLI 112 responsive to control signals provided by the controller 138. The controller 138 is configured to cause the voltage to be applied, and in particular, to send control signals that cause the voltage to be applied across respective fixed electrical conducting layers 128 and flexible electrical conducting layers 116. In embodiments, the respective fixed electrical conducting layers 128 and flexible electrical conducting layers 116 with the respective at least one electrical insulating layer therebetween are electrodes configured to act as a capacitor, which stores a charge that causes an electrostatic force between the respective fixed electrical conducting layers and the flexible electrical conducting layers that is greater than the respective stress gradient between the layers of the respective flexible membranes, which pulls the respective flexible electrical conducting layer towards the respective fixed electrical conducting layer and causes the respective flexible membrane to unfurl over the respective fixed membrane into the closed state/deployed condition.

In embodiments, each MLI 112 is configured to independently receive the voltage applied across a respective pair of the fixed electrical conducting layer 128 and the flexible electrical conducting layer 116. In some embodiments, the controller 138 is configured to control each of the plurality of the radiator panel 110 individually and independently cause the voltage to be applied across each respective pair of the fixed electrical conducting layer 128 and the flexible electrical conducting layer 116. In some embodiments, where the radiator panel 110 includes an array of MLI 112, each of the array of MLI 112 is configured to independently receive the voltage applied across a respective pair of the fixed electrical conducting layer 128 and the flexible electrical conducting layer 116. The controller 138 is configured to control each of the array of MLI 112 individually and independently cause the voltage to be applied across the respective pair of the fixed electrical conducting layer 128 and the flexible electrical conducting layer 116 of each of the array of MLI 112.

In embodiments, the controller 138 is connected to the sensors 136. The coupling 144 between the controller 138 and the sensors 136 is configured for the sensors 136 to send data to the controller 138, the data relating to the information sensed by the sensors 136. The controller 138 is configured (i.e., programmed) to control the radiator panels 110 responsive to values of the data received from the sensors 136, and in particular, is configured to determine whether the MLIs 112 should be in an open condition or a closed condition, and in response to determining that the MLIs 112 should be in a closed condition, cause the voltage to be applied across the respective fixed electrical conducting layers 128 and flexible electrical conducting layers 116 that should be in a closed condition. In embodiments, the controller 138 determines that the MLI 112 is to be open based on the data being a value that is at least one of at a predetermined threshold, below the predetermined threshold, and within a predetermined range of values. For example, in some embodiments, the sensors 136 are radiation sensors and the controller 138 is configured to close the MLIs 112 and keep the MLIs 112 close in response to a radiation level being at or below a predetermined radiation level and to open the MLIs 112 in response to the radiation level being above the predetermined radiation level. For example, while a space vehicle 100 is orbiting the earth and the sun is blocked by the earth, the radiation levels may be low and, in response, the MLIs 112 are closed to reduce heat loss by the space vehicle 100. However, once the sun is no longer blocked by the earth, the radiation levels may increase beyond the threshold value and, in response, the MLIs 112 are opened to allow radiation from the sun to provide heat to the space vehicle 100, such as to provide heat for temperature sensitive components of the space vehicle 100.

In embodiments, controller 138 includes a processor 140 and memory 142 storing computer-executable instructions that, when executed, cause the processor 140 to control the MLIs 112 in any manner disclosed herein or to perform any relevant method as disclosed herein.

Figure 11:
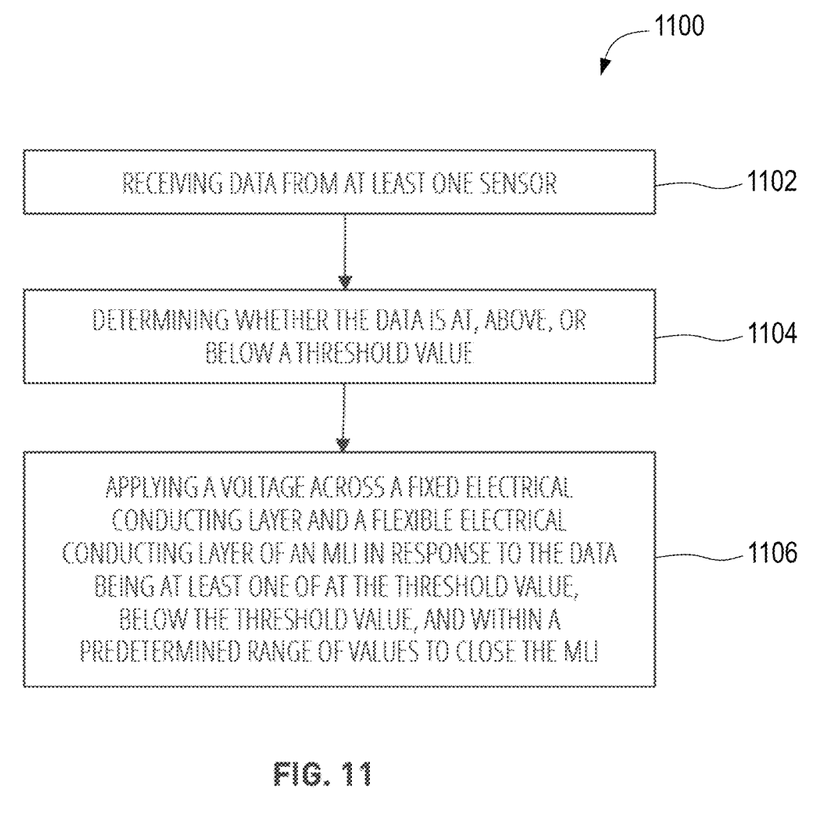
FIG. 11 is a flowchart of a method for managing a magnitude of radiation to which a space vehicle is exposed.

FIG. 11 is a flowchart of a method 1100 for managing a magnitude of radiation to which a space vehicle 100 is exposed. The method 1100 includes receiving data from at least on sensor at act 1102. The method 1100 also includes determining whether the data is at, above, or below a threshold value at act 1104. The method further 1100 includes applying a voltage across a fixed electrical conducting layer and a flexible electrical conducting layer of an MLI in response to the data being at least one of at the threshold value, below the threshold value, and within a predetermined range of values to close the MLI at act 1106. In some embodiments, the method 1100 includes providing the MLI. The MLI can be any MLI 112 disclosed herein. In some embodiments, the method 1100 also includes opening the MLI in response to the value being above the threshold value by causing the voltage to stop being applied across the fixed electrical conducting layer and the flexible electrical conducting layer of the MLI. Radiation leaving the space vehicle is reduced while the MLI is in a closed state relative to while the MLI is in an open state.

The MLI as disclosed herein allows for a ten-fold decrease in the mass of a thermal management system for a space vehicle in comparison to a thermal management system with a mechanical louver (estimated area density of 1 kg/m2). Additionally the solid state design of the MLI system may significantly increase reliability of the thermal control system of a space vehicle. For example, the MLI may switch between deployed and undeployed states in microseconds.

The MLI may reduce power consumed by the thermal management system of a space vehicle during an eclipse event since the MLI has a power draw significantly lower than that have mechanical louvers and resistive heaters, which power reduction may, in turn, allow power to be used for more mission critical applications.

The MLI may reduce the SWAP-C associated with the thermal management system of a space vehicle. The MLI is low power (3-5 mW/m$^2$) relative to other SWAP-C components/systems, lightweight, small sized, all solid state, low complexity, and allows for active control of space vehicle temperature without the need for wasting propellant on attitude changes, among other things. By reducing weight, the amount of space used, and the energy consumed by the thermal management system, launch costs may be reduced and extended mission lifetimes of the space vehicle may be realized.

The various illustrative logical blocks, modules, and circuits described in connection with the embodiments of the MLI system, and in particular, the controller of the MLI system, disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As used herein, the terms "adapted," "configured," and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

Although the present disclosure has been illustrated and described herein with reference to various embodiments and specific examples thereof, it will be readily apparent to those of ordinary skill in the art that other embodiments and examples may perform similar functions and/or achieve like results. All such embodiments and examples are within the spirit and scope of the present disclosure, are contemplated thereby, and are encompassed by the following claims and legal equivalents thereof.

What is claimed is:

1. A Multi-Layer Insulation, comprising:
a fixed membrane adjoining a substrate, the fixed membrane including a fixed electrical conducting layer;
a flexible membrane including a thermal insulator and a flexible electrical conducting layer, the thermal insulator comprising at least one layer of thermal insulation, the flexible membrane configured to furl into a rolled condition absent application of a voltage across the fixed electrical conducting layer and the flexible electrical conducting layer and to unfurl over the fixed membrane responsive to application of a voltage across the fixed electrical conducting layer and the flexible electrical conducting layer; and at least one electrical insulating layer between the fixed electrical conducting layer and the flexible electrical conducting layer, the at least one electrical insulating layer chosen from a fixed electrical insulating layer of the fixed membrane and an inner electrical insulating layer of the flexible membrane, the thermal insulator forming an outer layer of the flexible membrane on a side opposite the fixed membrane.

2. The Multi-Layer Insulation of claim 1, wherein the flexible membrane includes an outer electrical insulating layer fixed to the flexible electrical conducting layer between the flexible electrical conducting layer and the thermal insulator.

3. The Multi-Layer Insulation of claim 1, wherein the at least one layer of thermal insulation comprises a thermal coating.

4. The Multi-Layer Insulation of claim 3, wherein the thermal coating includes a polyimide film.

5. The Multi-Layer Insulation of claim 4, wherein the polyimide film includes a vapor deposited aluminum coating applied to an outer surface thereof.

6. The Multi-Layer Insulation of claim 1, wherein the substrate defines at least a portion of a radiator.

7. A radiator panel for a space vehicle, comprising:
a substrate of a radiator configured to facilitate emissivity of heat into and out of the space vehicle;
a Multi-Layer Insulation including,
a fixed membrane adjoining the substrate and configured to facilitate the emissivity of the heat into and out of the space vehicle, the fixed membrane including a fixed electrical conducting layer,
a flexible membrane including a thermal insulator and a flexible electrical conducting layer, the thermal insulator comprising at least one layer of thermal insulation, the flexible membrane configured to furl to an undeployed state responsive to a stress gradient between layers thereof and to unfurl to a deployed state positioning the thermal insulator over the fixed membrane responsive to application of a voltage across the fixed electrical conducting layer and the flexible electrical conducting layer, the flexible membrane configured to reduce the emissivity of the radiator panel while in the deployed state relative to the emissivity of the radiator panel while in the undeployed state, and
at least one electrical insulating layer between the fixed electrical conducting layer and the flexible electrical conducting layer, the at least one electrical insulating layer chosen from a fixed electrical insulating layer of the fixed membrane positioned on a side of the fixed electrical conducting layer opposite the substrate and an inner electrical insulating layer of the flexible membrane positioned on an inner side of the flexible membrane adjacent to the fixed membrane; and
a compartment positioned adjacent to and longitudinally coextensive with an edge of the fixed membrane and open in an opposing direction from the edge, the compartment sized and configured to receive the flexible membrane in an undeployed and furled condition adjacent to the edge.

8. The radiator panel of claim 7, comprising a plurality of the Multi-Layer Insulations.

9. The radiator panel of claim 8, wherein the plurality of the Multi-Layer Insulations is configured for individual control of each of the plurality of the Multi-Layer Insulation with each of the plurality of the Multi-Layer Insulation being configured to independently receive application of the voltage across a respective pair of the fixed electrical conducting layer and the flexible electrical conducting layer.

10. The radiator panel of claim 7, wherein the compartment is sized to present a low-profile relative to the fixed membrane.

11. The radiator panel of claim 7, wherein the thermal insulator forms an outer layer of the flexible membrane on a side opposite the fixed membrane.

12. The radiator panel of claim 11, wherein the flexible membrane includes an outer electrical insulating layer fixed to the flexible electrical conducting layer between the flexible electrical conducting layer and the thermal insulator.

13. The radiator panel of claim 7, wherein the at least one layer of thermal insulation comprises a thermal coating.

14. The radiator panel of claim 13, wherein the thermal coating includes a polyimide film.

15. A space vehicle, comprising:
a plurality of radiator panels, each of the plurality of radiator panels including,
a substrate of a radiator configured to facilitate emissivity of heat into and out of the space vehicle, and
a Multi-Layer Insulation comprising:
a fixed membrane adjoining the substrate and configured to facilitate the emissivity of the heat into and out of the space vehicle, the fixed membrane including a fixed electrical conducting layer;
a flexible membrane including a thermal insulator and a flexible electrical conducting layer, the thermal insulator comprising at least one layer of thermal insulation, the flexible membrane configured to furl to an undeployed state responsive to a stress gradient between layers thereof and to unfurl to a deployed state positioning the thermal insulator over the fixed membrane responsive to application of a voltage across the fixed electrical conducting layer and the flexible electrical conducting layer, the flexible membrane configured to reduce the emissivity of the radiator panel while in the deployed state relative to the emissivity of the radiator panel while in the undeployed state; and
at least one electrical insulating layer between the fixed electrical conducting layer and the flexible electrical conducting layer, the at least one electrical insulating layer chosen from a fixed electrical insulating layer of the fixed membrane positioned on a side of the fixed electrical conducting layer opposite the substrate and an inner electrical insulating layer of the flexible membrane positioned on an inner side of the flexible membrane adjacent to the fixed membrane; and
a controller operatively coupled to the Multi-Layer Insulation of each of the plurality of radiator panels and configured to cause the voltage to be applied across the fixed electrical conducting layer and the flexible electrical conducting layer to deploy the flexible membrane over the fixed membrane, the controller configured to control each of the plurality of radiator panels individually and independently cause the voltage to be applied across each respective pair of the fixed electrical conducting layer and the flexible electrical conducting layer.

16. The space vehicle of claim 15, wherein the at least one radiator panel comprises a plurality of the Multi-Layer Insulations, each of the plurality of the Multi-Layer Insulations being configured to independently receive the voltage applied across a respective pair of the fixed electrical conducting layer and the flexible electrical conducting layer, and wherein the controller is configured to control each of the plurality of the Multi-Layer Insulations individually and independently cause the voltage to be applied across the respective pair of the fixed electrical conducting layer and the flexible electrical conducting layer of each of the plurality of the Multi-Layer Insulations.

17. The space vehicle of claim 15, wherein the radiator panel comprises an open-mouthed compartment positioned adjacent to an edge of the fixed membrane, the compartment configured to receive the flexible membrane in an undeployed and furled condition through the open mouth.

18. A Multi-Layer Insulation, comprising:
a fixed membrane adjoining a substrate, the fixed membrane including a fixed electrical conducting layer;
a flexible membrane including a thermal insulator and a flexible electrical conducting layer, the thermal insulator comprising at least one layer of thermal insulation, the flexible membrane configured to furl into a rolled condition absent application of a voltage across the fixed electrical conducting layer and the flexible electrical conducting layer and to unfurl over the fixed membrane responsive to application of a voltage across the fixed electrical conducting layer and the flexible electrical conducting layer; and
at least one electrical insulating layer between the fixed electrical conducting layer and the flexible electrical conducting layer, the at least one electrical insulating layer chosen from a fixed electrical insulating layer of the fixed membrane and an inner electrical insulating layer of the flexible membrane,
the at least one layer of thermal insulation comprising a thermal coating.

19. A radiator panel for a space vehicle, comprising:
a substrate of a radiator configured to facilitate emissivity of heat into and out of the space vehicle; and
a plurality of Multi-Layer Insulation, each of the plurality of Multi-Layer Insulation including,
a fixed membrane adjoining the substrate and configured to facilitate the emissivity of the heat into and out of the space vehicle, the fixed membrane including a fixed electrical conducting layer,
a flexible membrane including a thermal insulator and a flexible electrical conducting layer, the thermal insulator comprising at least one layer of thermal insulation, the flexible membrane configured to furl to an undeployed state responsive to a stress gradient between layers thereof and to unfurl to a deployed state positioning the thermal insulator over the fixed membrane responsive to application of a voltage across the fixed electrical conducting layer and the flexible electrical conducting layer, the flexible membrane configured to reduce the emissivity of the radiator panel while in the deployed state relative to the emissivity of the radiator panel while in the undeployed state, and
at least one electrical insulating layer between the fixed electrical conducting layer and the flexible electrical conducting layer, the at least one electrical insulating layer chosen from a fixed electrical insulating layer of the fixed membrane positioned on a side of the fixed electrical conducting layer opposite the substrate and an inner electrical insulating layer of the flexible membrane positioned on an inner side of the flexible membrane adjacent to the fixed membrane,
the plurality of the Multi-Layer Insulations configured for individual control of each of the plurality of the Multi-Layer Insulation with each of the plurality of the Multi-Layer Insulation being configured to independently receive application of the voltage across a respective pair of the fixed electrical conducting layer and the flexible electrical conducting layer.

20. A space vehicle, comprising:
at least one radiator panel including,
a substrate of a radiator configured to facilitate emissivity of heat into and out of the space vehicle, and
a Multi-Layer Insulation comprising:
a fixed membrane adjoining the substrate and configured to facilitate the emissivity of the heat into and out of the space vehicle, the fixed membrane including a fixed electrical conducting layer;
a flexible membrane including a thermal insulator and a flexible electrical conducting layer, the thermal insulator comprising at least one layer of thermal insulation, the flexible membrane configured to furl to an undeployed state responsive to a stress gradient between layers thereof and to unfurl to a deployed state positioning the thermal insulator over the fixed membrane responsive to application of a voltage across the fixed electrical conducting layer and the flexible electrical conducting layer, the flexible membrane configured to reduce the emissivity of the radiator panel while in the deployed state relative to the emissivity of the radiator panel while in the undeployed state; and
at least one electrical insulating layer between the fixed electrical conducting layer and the flexible electrical conducting layer, the at least one electrical insulating layer chosen from a fixed electrical insulating layer of the fixed membrane positioned on a side of the fixed electrical conducting layer opposite the substrate and an inner electrical insulating layer of the flexible membrane positioned on an inner side of the flexible membrane adjacent to the fixed membrane; and
a controller operatively coupled to the Multi-Layer Insulation of the at least one radiator panel and configured to cause the voltage to be applied across the fixed electrical conducting layer and the flexible electrical conducting layer to deploy the flexible membrane over the fixed membrane,
the radiator panel comprising an open-mouthed compartment positioned adjacent to an edge of the fixed membrane, the compartment configured to receive the flexible membrane in an undeployed and furled condition through the open mouth.

* * * * *